(12) United States Patent
Franke

(10) Patent No.: US 8,986,038 B2
(45) Date of Patent: Mar. 24, 2015

(54) ELECTRICAL CABLE CONNECTOR

(75) Inventor: Jens Franke, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 75 days.

(21) Appl. No.: 13/824,474

(22) PCT Filed: Sep. 30, 2011

(86) PCT No.: PCT/EP2011/004926
§ 371 (c)(1),
(2), (4) Date: Mar. 18, 2013

(87) PCT Pub. No.: WO2012/045431
PCT Pub. Date: Apr. 12, 2012

(65) Prior Publication Data
US 2013/0183848 A1    Jul. 18, 2013

(30) Foreign Application Priority Data

Oct. 4, 2010  (DE) .......................... 10 2010 047 216

(51) Int. Cl.
| | |
|---|---|
| H01R 13/627 | (2006.01) |
| H01R 13/622 | (2006.01) |
| H01R 4/30 | (2006.01) |
| H01R 13/59 | (2006.01) |
| H01R 13/595 | (2006.01) |
| H02G 15/115 | (2006.01) |

(52) U.S. Cl.
CPC ............... *H01R 13/622* (2013.01); *H01R 4/30* (2013.01); *H01R 13/59* (2013.01); *H01R 13/595* (2013.01); *H02G 15/115* (2013.01)
USPC .......................................... 439/359; 439/462

(58) Field of Classification Search
USPC .......... 439/359, 277, 369, 320–321, 426, 462
See application file for complete search history.

(56) References Cited

U.S. PATENT DOCUMENTS

| | | | |
|---|---|---|---|
| 3,281,755 A | 10/1966 | Trager | |
| 7,303,418 B2 * | 12/2007 | O'Connor | ...................... 439/277 |
| 7,988,476 B2 * | 8/2011 | Billman et al. | ............... 439/271 |
| 8,398,419 B2 * | 3/2013 | Coyle, Jr. | ...................... 439/275 |
| 2006/0035509 A1 | 2/2006 | O'Connor | |
| 2010/0029114 A1 | 2/2010 | Hsu et al. | |

FOREIGN PATENT DOCUMENTS

EP    1122490 A1    8/2001

* cited by examiner

*Primary Examiner* — Xuong Chung Trans
(74) *Attorney, Agent, or Firm* — Leydig, Voit & Mayer, Ltd.

(57) ABSTRACT

A cable connector includes a housing and a first screwed cable gland for receiving a first cable and a second screwed cable gland for receiving a second cable, wherein a contact device is provided on which the first cable can be connected to the second cable. A detent device is provided, which, when one of the screwed cable glands is screwed to the housing, latches the contact device to the screwed cable gland such that the cables are received on the housing in a contact-safe manner.

9 Claims, 2 Drawing Sheets

ELECTRICAL CABLE CONNECTOR

CROSS REFERENCE TO RELATED APPLICATIONS

This application is a U.S. national phase application under 35 U.S.C. §371 of International Application No PCT/EP2011/004926, filed on Sep. 30, 2011 and claims benefit to German Patent Application No. DE 10 2010 047 216.6, filed on Oct. 4, 2010. The international application was published in German on Apr. 12, 2012, as WO 2012/045431 A1 under PCT Article 21(2).

The present invention relates to a cable connector for at least two electrical cables. In principle, the invention can be used for connecting any cables. A particularly preferred field of use is the connection of solar cables, which are used for transmitting power and/or for transmitting signals to photovoltaic systems. When assembling photovoltaic systems, the cables often have to be laid flexibly. In this case, it is possible that cables have to be lengthened or shortened in order to be optimally laid on, for example, the roof of a building.

Cable connectors which are used in the field of photovoltaic systems are often exposed to hostile environmental conditions, since they are often laid outdoors in a more or less unprotected manner. Therefore, cable connectors have to meet increased protection requirements in order to ensure that persons are protected from potential danger when using said cable connectors and also to protect the system itself. Usually, for cable connectors of this type which are outdoors, at least one protection class IP67 in accordance with DIN EN 60529 or DIN 40050 part 9 is required. This means that there is protection against access by a wire and the cable connector is closed in a dust-tight manner. Furthermore, there is at least protection against temporary immersion in water. Operating states of this type can occur for example in rain or snow.

A further important property of cable connectors of this type is that of providing reliable touch protection.

Since photovoltaic systems are often installed on roofs of residential buildings of private individuals, it is also necessary to provide touch protection such that private individuals cannot inadvertently touch the live parts.

It is therefore the object of the present invention to provide a cable connector which tightly interconnects two cable ends, the cable ends being protected against contact with an inexperienced users hand.

This object is achieved by a cable connector having the features of claim 1. Preferred developments of the invention are the subject matter of the dependent claims. Further advantages and features of the invention emerge from the description of the embodiment.

The cable connector according to the invention is provided with a housing. The cable connector according to the invention comprises a first cable gland for receiving a first cable and at least one second cable gland for receiving a second cable. At least one contact means is provided, on which at least the first cable can be connected to at least the second cable. Furthermore, at least one locking means is provided, which locks the contact means to the cable gland when screwing at least one cable gland to the housing, such that the cable is received on the housing so as to be safe to touch. In this case, the first cable gland can be screwed to the housing or the second cable gland can be screwed to the housing or the first cable gland and the second cable gland can be screwed to the housing.

The cable connector according to the invention has many advantages, since it is simply constructed, provides reliable protection against environmental influences and is constructed so as to be safe to touch. Increased protection is ensured by the locking means, since when screwing the corresponding cable gland to the housing, a locking state occurs which cannot be released manually.

In particular, the locking means can be configured such that it is not possible for it to be opened in a non-destructive manner after being locked into place. As a result, a particularly high level of protection is achieved, since an inexperienced person who picks up the cable connector cannot open said cable connector to such an extent that they come into touching contact with the cable ends.

The housing preferably comprises at least one tube means, in which the contact means can be received in a twist-proof manner and so as to be safe to touch. This means that the tube means more particularly completely receives the contact means. If the tube means is, for example, cylindrical, then the tube means protects against touching contact of the contact means over the entire circumference of the cylinder, such that only the possibly open end faces of the tube means still have to be protected.

In particular, the tube means consists of a non-conductive material, which is for example plastics material. The tube means does not have to be cylindrical, but can also have, for example, a rectangular external cross-section.

Other polygonal cross-sections or elliptical cross-sections or the like are possible. The internal cross-section of the tube means is in particular formed such that the contact means can be received in a twist-proof manner inside the tube means. For example, it is possible for the tube means to be slid over a cable end for assembly, then for the cable ends to be interconnected on the contact means, and then for the tube means to be slid over the contact means until it receives the contact means inside in a twist-proof manner.

A configuration of this type comprising a tube means which receives the contact means in a twist-proof manner and so as to be safe to touch has considerable advantages. In particular, the construction of a cable connector of compact design which only requires a small amount of space is also made possible. As a result, it is also possible to lay a cable connector in thin profiles or in narrow grooves, which are found for example on roofs or façades. Cable connectors from the prior art which are large in size often cannot be used here, since the space available is not always sufficient. In this case, the cable connector according to the invention provides considerable advantages since it is constructed flexibly and depending on requirements.

The tube means is preferably provided with the first or the second cable gland. This means that the tube means is rigidly connected to the first or the second cable gland. It is possible for the tube means to be formed in one piece with a cable gland.

Advantageously, the contact means is formed as a contact base. The contact base can comprise a plurality of contacts, which are provided for connecting multi-wired cables.

The locking means preferably comprises at least one locking unit on the contact base and at least one locking unit cooperating therewith on at least one cable gland. The locking units which cooperate with one another on the contact base and the contact unit respectively and on the cable gland make simple assembly possible, in which automatic release is no longer possible after locking the locking units of the locking means. For releasing the connection and opening the cable connector, the locking means has to be released again, and in certain configurations this is only possible by reversibly deforming or damaging or even destroying one of the locking units. As a result, reliable protection against inadvertent opening is ensured, since initially a force has to be used which is such that a locking unit deforms, is damaged or is even destroyed.

At least one locking unit is preferably formed as spur gearing. It is possible for the locking unit to be formed as a spur gearing on the contact base and/or for the locking unit to be formed as a spur gearing on the cable gland. It is also possible for only one of the two locking units to be formed as a spur gearing, while the other locking unit comprises locking teeth or the like which cooperate with the other spur gearing.

Advantageously, at least one spur gearing comprises resiliently formed teeth. The resiliently formed teeth are formed in particular on the contact means and preferably on the contact base. The resiliently formed teeth can consist of a plastics or metal material and can be biased into the locking position. When screwing the cable to the housing, the spur gearing of the contact base comes into contact with the spur gearing of the cable gland, the resiliently formed teeth preferably resiliently pivoting back during the screwing process. Further unscrewing of the cable gland is then not possible, since the two spur gearings engage with one another and there is no or only a very small force component, which brings the resiliently formed teeth out of engagement with the spur gearing again.

In preferred configurations, the contact base comprises at least one contact which is taken from a group of contacts which includes screwed contacts, clamping contacts, plug contacts, soldering contacts and the like.

In a specific configuration, at least one contact is formed as a screwed contact. It is likewise possible for the contacts to be constructed as clamping contacts or for the individual wires of the cables which are to be interconnected to be soldered to one another.

In preferred configurations, the contact base is provided with a spur gearing on both sides. The contact base is constructed in particular vertically symmetrically.

A vertically symmetrical contact base which is provided with a spur gearing on both sides has many advantages, since it makes it possible to open the cable connector again after locking for the first time, even if the locking unit on the end face has been damaged during opening. The contact base can then be installed again in reverse and the spur gearing on the other side can be used for locking engagement with a corresponding cable gland.

In addition, a vertically symmetrical constructed contact base also makes assembly simpler, since during assembly, attention does not have to be paid to which side of the contact base is oriented towards which side.

It is also possible for a cable gland to be screwed to both sides of the tube means, which cable gland correspondingly locks to a spur gearing of the contact base.

In all the configurations, the cable can comprise two or more and in particular also five, eight, ten or twelve or another number of wires. In all the configurations, the cable glands preferably comprise threads on the sides facing away from one another, in order to be screwed to corresponding nuts. When screwing the nut to the corresponding cable gland, the received cable is received in a clamping manner on the cable gland. For sealing, a seal is preferably provided inside the cable gland and consists in particular of a rubber-resilient material or the like.

For assembly, a nut and the corresponding cable gland or tube means comprising an associated cable gland is slid onto a cable end and the two cable ends are interconnected on the contact base. One cable gland is then slid onto the contact base from one side and the other cable gland, optionally comprising the tube means, is slid onto the contact base from the other side, such that the contact base is received in a twist-proof manner inside the tube means. The cable gland(s) is/are then screwed to the tube means. In this state, the contact base is already received on the housing so as to be safe to touch. Since the cable gland is locked in place on the contact base, it is not possible to readily open the housing. In particular, the housing cannot be opened again manually without a tool, such that there is very reliable protection against touching the wires, even for inexperienced persons.

After the cable gland is screwed to the tube means, the nuts on the ends of the cable glands are screwed to the cable glands, such that the cable ends are received in a clamping and sealed manner on the cable glands.

The cable connector according to the invention provides a connection for at least two cables which is easy to assemble, it being possible for the cable connector to consist of four simple plastics pieces and a contact base for connecting the cable ends of the cables to be interconnected. The construction is of compact design and the assembly can take place easily and without special tools.

Further advantages and features of the present invention emerge from the description of the embodiment.

Figure 1:
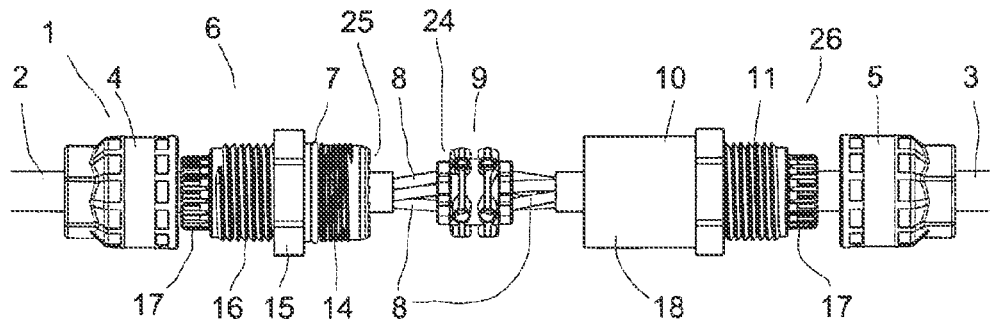
FIG. 1 is a schematic exploded view of a cable connector according to the invention.

With reference to the appended FIGS. 1 to 6, an embodiment of a cable connector 1 according to the invention is explained in the following, a schematic exploded view of the cable connector 1 being shown in FIG. 1. The cable connector 1 is used to connect two cables 2 and 3, which each comprise a plurality of individual wires 8.

The electrical contact of the individual wires 8 is produced on the contact means 9 which is formed as a contact base 29.

For this purpose, screwed contacts are provided on the contact base 29 in this case, the individual wires 8 being attached in a clamping manner to the contact base 29 via screws 13 and thus being electrically interconnected.

The entire cable connector 1 consists in this case of the contact base 29, a tube means 10 and cable glands 6 and 26, and two nuts 4 and 5, which are screwed onto each of the cable glands 6 and 26 on the two ends of the cable connector 1, in order to seal the ends of the cables 2 and 3 against the cable connector and to receive the cables 2 and 3 on the cable connector 1 in a clamping manner.

Sealing blades 17 are provided on the cable glands 6 and 26, which blades are laterally bent on the cable glands 6 and 26 when the nuts 4 and 5 are screwed on, and clamp seals 30 which are provided inside the cable glands 6 and 26 against the cable ends of the cables 2 and 3 in a sealing manner. The seals consisting of a rubber-resilient material resiliently deform and permanently clamp the cables 2 and 3 tightly inside the cable glands 6 and 26.

The cable gland 6 comprises an external thread 14 on the side facing the contact base 29 and an external thread 16 on the end assigned to the cable 2, onto which external thread the nut 4 is screwed. A key surface 15 is provided on the cable gland 6 in order to be gripped by a tool. A sealing means 7 in the form of, for example, an O-ring seals the cable gland 6, which is screwed into the tube means 10, radially outwards, such that the inside of the tube means 10 is protected from dust and moisture entering.

In this case, the other cable gland 26 is rigidly connected to the tube means 10 and can for example be produced in one piece with the tube means 10. An internal thread 18 on the tube means 10 is used for screwing to the external thread 14 of the cable gland 6.

The cable gland 26 comprises an external thread 11 on the end facing the cable 3, onto which thread the nut 5 is screwed in order to receive the cable 3 on the cable gland 26 in a clamping manner via the seal 30, which is not visible in FIG. 1.

Figure 2:
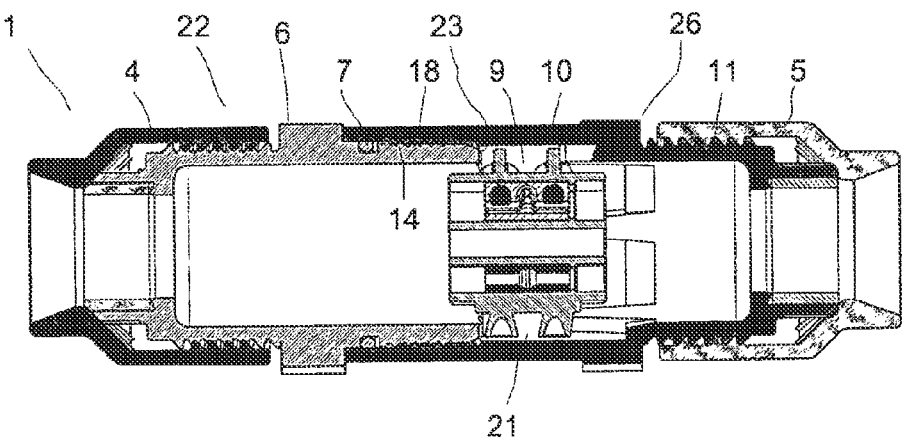
FIG. 2 is a cross-section through a cable connector according to FIG. 1.

FIG. 2 shows a cross-section of the cable connector 1 when assembled, without a cable 2 and 3 connected.

The contact base 29 is received inside the tube means 10, which is formed in one piece together with the cable gland 26. In this case, the contact base 29 is received inside the tube means 10 in a twist-proof manner. The seals 30 inside the screwed connections 6 and 26 can also be seen in FIG. 2 and are pressed to the cables 2 and 3 when screwing on the nuts 4 and 5 in order to make possible and ensure a dust-tight and water-tight lead-through of the cables 2 and 3 at the ends of the cable connector 1.

Figure 3:
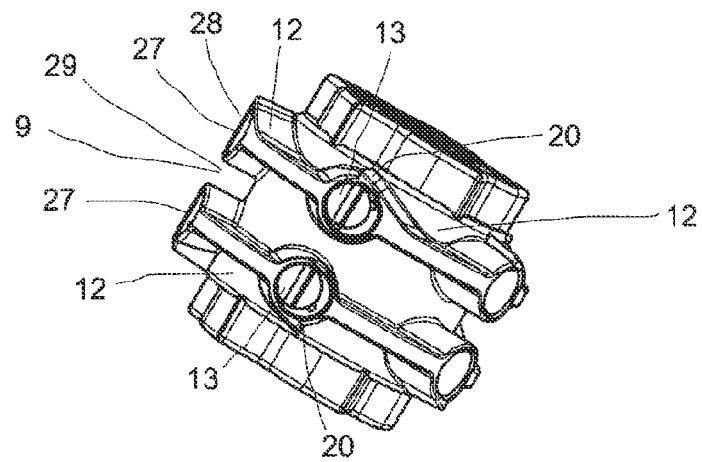
FIG. 3 is a perspective view of a contact base of the cable connector according to FIG. 1.

FIG. 3 is a perspective view of the contact base 29, the individual screws 13 of the contacts 27 being visible. The contacts 27 are constructed as screwed contacts 28 in this case.

Spur gearings 12 are provided on the end faces of the contact base 29, have resiliently formed teeth 20 and each form a locking unit 24 on each end face of the contact base 29.

Figure 4:
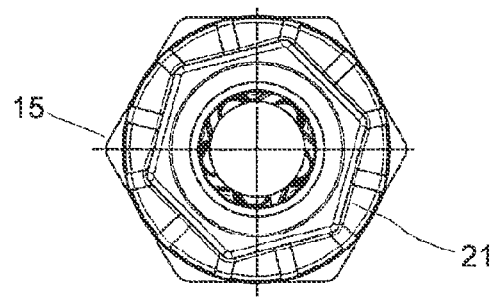
FIG. 4 is a plan view of the tube means of the cable connector according to FIG. 1.

FIG. 4 is a plan view of the inside of the tube means 10, the key surfaces 15 being visible on the outside. An inner contour 21 is used as an anti-twist protection for the contact base 29.

Figure 5:
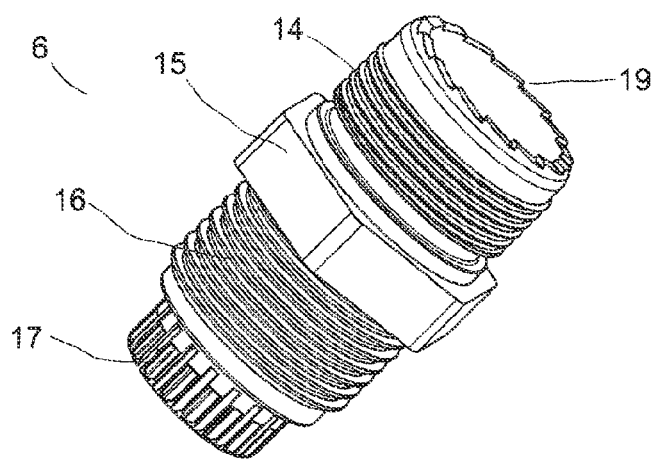
FIG. 5 is a perspective view of a cable gland of the cable connector according to FIG. 1.
Figure 6:
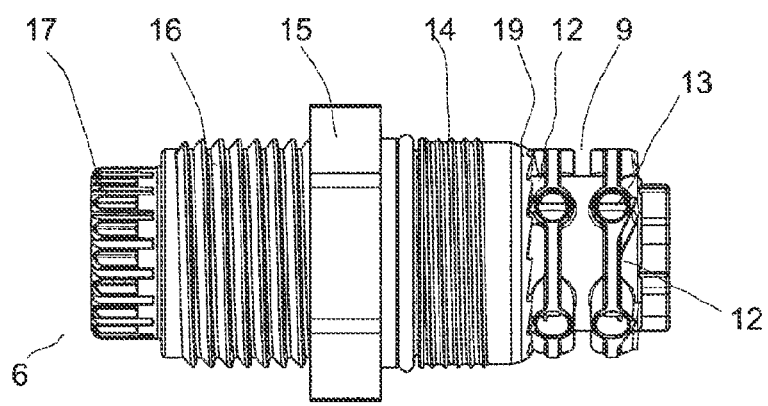
FIG. 6 shows a cable gland of the cable connector according to FIG. 1, which cable gland is locked to the contact base.

FIG. 5 is an enlarged perspective view of the cable gland 6, which comprises the sealing blades 17 on the end facing the cable end. The external thread 16 is used for screwing on the nut 4. The key surfaces 15 can be gripped by pliers or a spanner or another tool in order to turn the cable gland 6 in a defined manner. The external thread 14 is used to screw to the internal thread 18 of the tube means 10.

Furthermore, the spur gearing 19 which is provided in the axial direction on the end face of the external thread 14 can be clearly seen in FIG. 5. When assembled, as shown in FIG. 2 in cross-section or in FIG. 6, the spur gearing 19 as a locking unit 25 engages with the spur gearing 12 as a locking unit 24. After the cable gland 6 is subsequently screwed to the tube means 10, the two components lock with one another and can only be separated from one another again using considerable force. In general, this requires destruction of the locking unit 24 on the contact base 29, such that the cable connector 1 is protected against inadvertent opening when assembled.

It is indeed possible to unscrew the nuts 4 and 5 from the ends of the cable connector 1, however the contacts on the contact base 29 are not accessible by hand or the like since they are received inside the cable connector 1 in a protected manner. Overall, the cable glands 6 and 26 together with the tube means 10 form a housing 22, which reliably surrounds the contact base 29. For further opening the cable connector 1, a tool is required. This means that inadvertent opening by hand is not possible in practice.

For assembly, the cable ends of the cables are stripped and the individual wires 8 are bared. One cable end is inserted through the nut 5 and through the tube means 10. The wires 8 are connected to one side of the contact base 29. The other cable is then inserted through the nut 4 and through the cable gland 6 and likewise is connected to the contact base 29. The contact base 29 is then pulled into the tube means 10 by pulling on the cable 3 and is fixed by screwing on the nut 5. In the next step, the cable gland 6 is screwed into the tube means 10. Finally, the nut 4 is screwed onto the cable gland 6.

Overall, the cable connector 1 consists of only a few different plastics parts, such that simple and cost-effective production is possible. The assembly is simple and reliable and makes possible a high level of protection against inadvertent touching by locking the components. The entire construction is of compact design and can be used flexibly in tight spaces. No special tool is required for processing, which is often not available when assembling photovoltaic systems on roofs or the like.

Owing to the resilient installation of the teeth 20 of the spur gearing 12 in the region of the screw socket of the screws 13 of the contact base 29, flexible yielding of the teeth is possible when screwing. The teeth resist further screwing, such that reliable protection is achieved.

LIST OF REFERENCE NUMERALS 1 cable connector
2 cable
3 cable
4 nut
5 nut
6 cable gland
7 sealing means, O-ring
8 wire
9 contact means
10 tube means
11 thread
12 spur gearing
13 screw
14 external thread
15 key surface
16 external thread
17 sealing blades
18 internal thread
19 spur gearing
20 tooth
21 inner contour
22 housing
23 locking means
24 locking unit
25 locking unit
26 cable gland
27 contact
28 screwed contact
29 contact base
30 seal

The invention claimed is:

1. A cable connector comprising a housing, comprising:
a first cable gland for receiving a first cable;
a second cable gland for receiving a second cable;
at least one contact base configured to form a contact between at least the first cable and the second cable, the at least one contact base including a first locking unit; and
at least one locking device disposed between the first cable gland and the contact base; the at least one locking device including a second locking unit configured to engage the first locking unit so as to lock the contact base to the first cable gland.

2. The cable connector of claim 1, wherein the housing comprises at least one tube means, in which the contact base can be received in a twist-proof manner and so as to be safe to touch.

3. The cable connector of claim 1, wherein the tube means is provided with the first or second cable gland.

4. The cable connector of claim 1, wherein the locking unit is formed on the contact base as a spur gearing.

5. The cable connector of claim 1, wherein the locking unit is formed on the cable gland as a spur gearing.

6. The cable connector of claim 5, wherein at least one spur gearing comprises resiliently formed teeth.

7. The cable connector of claim 1, wherein the contact bases comprise at least one contact which is taken from a group of contacts which includes screwed contacts, clamping contacts, soldering contacts and plug contacts.

8. The cable connector of claim 1, wherein the contact base is provided on both sides with a spur gearing and is constructed in particular vertically symmetrically.

9. The cable connector of claim 1, wherein at least one cable comprises at least two wires.

* * * * *